United States Patent
Purcell

[11] 3,882,683
[45] May 13, 1975

[54] DRAIN EXTENSION

[76] Inventor: Robert M. Purcell, 22 Ronald Ln., Sayville, N.Y. 11782

[22] Filed: July 30, 1973

[21] Appl. No.: 384,027

[52] U.S. Cl..................................... 61/13; 210/532 S
[51] Int. Cl............................................. E02b 13/00
[58] Field of Search ........................ 61/10, 11, 12, 13; 210/170, 532 S; 137/236

[56] References Cited
UNITED STATES PATENTS

| | | | |
|---|---|---|---|
| 221,439 | 11/1879 | Blose | 61/10 |
| 2,767,801 | 10/1956 | Eads | 210/170 |
| 2,782,604 | 2/1957 | Mixon | 61/11 |
| 3,369,367 | 2/1968 | Saad et al. | 61/11 |
| 3,401,526 | 9/1968 | Rodgers | 61/13 |
| 3,501,007 | 3/1970 | Davis | 61/11 |
| 3,579,995 | 5/1971 | Flynn | 61/13 |
| 3,645,100 | 2/1972 | La Monica | 61/13 |

*Primary Examiner*—Paul R. Gilliam
*Assistant Examiner*—Alex Grosz
*Attorney, Agent, or Firm*—Stephen E. Feldman

[57] ABSTRACT

A plurality of elongated channel like elements are formed for interconnection to each other and, through associated fittings into various configurations, for the purpose of conducting fluids from seeping wells, septic systems, and drains into leeching field arrangements. Each extension is open at its ends and is formed with a roof, apertured and spaced side walls, and inwardly extending but spaced flat horizontal legs so as to be open along its bottom and provides support so it does not sink into the earth. A louver extends upwardly and inwardly from proximate the bottom edge of each aperture at an appropriate angle and for a predetermined distance so as to terminate spaced inwardly from and at a level higher than the upper edge of the aperture.

9 Claims, 7 Drawing Figures

PATENTED MAY 13 1975 3,882,683
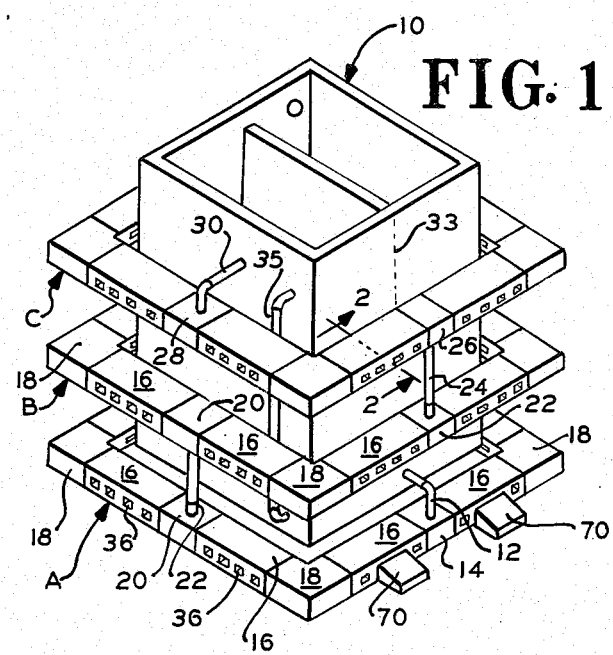
FIG. 1
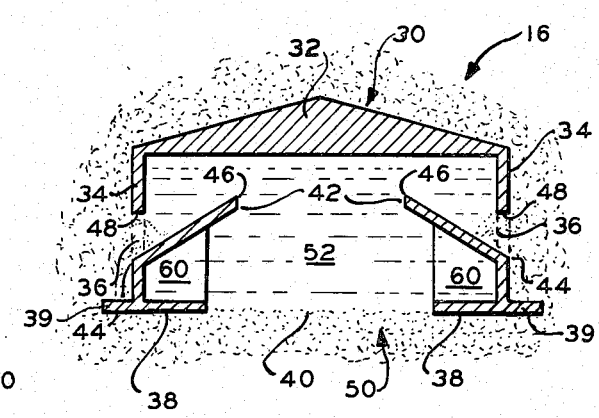
FIG. 2
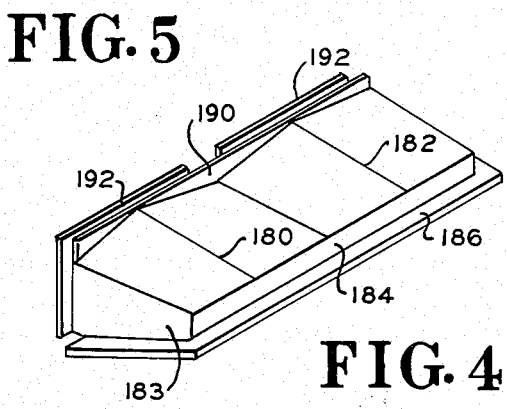
FIG. 5
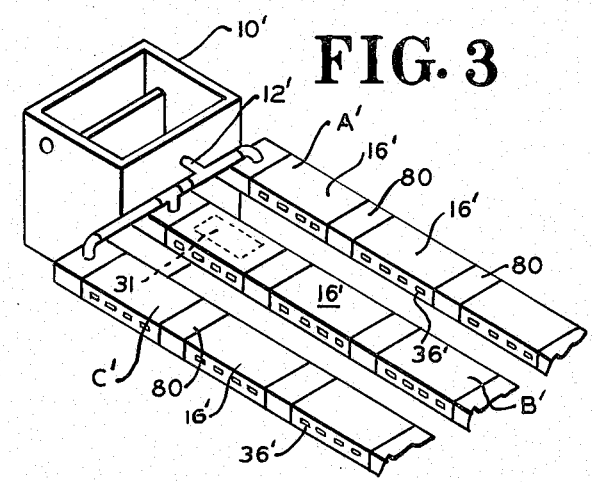
FIG. 3
FIG. 4
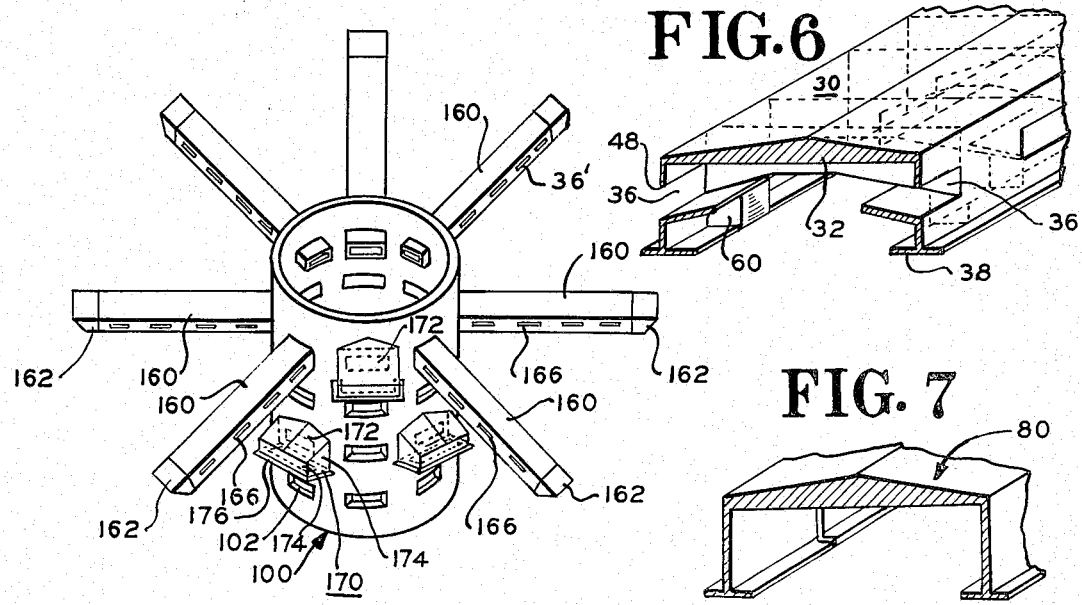
FIG. 6
FIG. 7
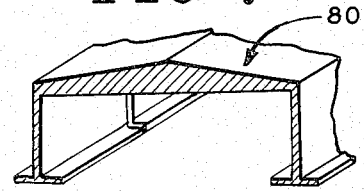

DRAIN EXTENSION

BACKGROUND OF THE INVENTION

1. Field of Application

This invention relates to drainage systems and more particularly to drainage members for seeping wells and septic tank leeching fields.

2. Prior Art

A lot of fluid collects in seeping wells and in septic systems; and this fluid must be absorbed into the adjacent soil if the well or system is to continue to function. The process of absorption not only depends upon the nature of the soil (whether it is sandy, has a high clay content, etc.) but also on the soil area to which the fluids to be absorbed are exposed. Leeching fields are utilized to provide more soil area for fluid absorption. Fluid conductors in the form of trenches, apertured pipes, and apertured channeling systems of various configuration, have been devised to disperse the fluid over greater soil areas to facilitate fluid absorption.

The mere use of apertured members however, has proved unsatisfactory in sandy soils because the soil may either obstruct the conductor by flowing into the apertures or simply stop fluid flow from the conductor by clogging the apertures. In the alternative some existing systems provide intricate constructions in an attempt to prevent sandy soil from flowing into and/or clogging the apertures; but such constructions have turned out to be unwieldly and ineffective to cure the problem.

SUMMARY OF THE INVENTION

It is therefore an object of this invention to provide a new and improved drain extension.

It is another object to provide a new and improved drain extension for use with seeping wells and septic systems.

It is a further object to provide a new and improved drain extension for use in leeching fields.

It is still another object to provide a new and improved drain extension for leeching fields wherein sandy soil is prevented from flowing into or clogging fluid apertures formed in the extension.

It is yet another object to provide a new and improved leeching field drain extension and associated fittings adapted for interconnection into various configurations to facilitate fluid flow and maximum exposure to and absorption into the adjacent soil.

This invention involves a drain extension formed with fluid flow apertures; and contemplates forming louvers proximate such apertures in such a way that fluid can flow outwardly from the extension through said apertures but adjacent soil cannot flow into the extension through such apertures, and is otherwise inhibited from clogging or otherwise obstructing fluid flow from said apertures.

Other objects, features, and advantages of the invention, in its details of construction and arrangement of parts, will be seen from the above, and from the following description of the preferred embodiment when considered in conjunction with the drawings, and from the appended claims.

BRIEF DESCRIPTION OF THE DRAWINGS

FIG. 1 is a perspective showing of a septic tank with a leeching field formed by drain extensions and associated interconnecting elements all incorporating the instant invention.

FIG. 2 is a sectional view through a drain extension incorporating the instant invention taken on line 2—2 of FIG. 1.

FIG. 3 is a perspective of a septic tank showing a modified leeching field arrangement provided with drain extensions incorporating the instant invention.

FIG. 4 is a perspective showing of a storm drain provided drain extensions incorporating the instant invention.

FIG. 5 is a view of a hood which fits over the drain openings.

FIG. 6 is a perspective sectional view of the extension of FIG. 2.

FIG. 7 is a cross sectional view of coupling 80 of FIG. 3.

PREFERRED EMBODIMENT OF THE INVENTION

With reference to FIG. 1, there is generally shown at 10 a conventional septic tank, which may be made from concrete, metal or other suitable material. Tank 10 is constructed to be buried in the ground, and by proper plumbing interconnections, so as to receive solid and fluid waste matter. The solid matter is subjected to continuing bacterial action in the tank while the liquid is to be drained off through one or more suitably disposed drains.

In the novel arrangement of FIG. 1, the liquid is drained through a pipe 12 into a coupling 14 interconnecting a pair of drain extensions 16 (FIGS. 1 and 2) of a first leeching tier A. Additional drain extensions 16 are disposed in tier A all interconnected through elbows 18 to form a complete channel around tank 10. The number of extensions 16 utilized depends upon their repsective lengths and the size of tank 10 but a sufficient number are utilized to complete the tier with provision for a coupling 20 provided with spout 22 leading up to a second leeching tier B also formed from an appropriate number of extensions 16 and elbows 18. A coupling 22 leads through a spout 24 into a coupling 26 of a third leeching C formed from extensions 16 and elbows 18 with a coupling 28 having a pipe 30 leading back into tank 10 to provide for venting and any overflow which might occur. Additional couplings may be used as required.

Extensions 16, elbows 18 and couplings 14, 20, 22, 26 and 28 are formed with interfitting ends to facilitate interconnection to each other. The ends may be interfitted in any suitable manner. Extensions 16, elbows 18 and couplings 14, 20, 22, 26 and 28 may furthermore be formed from plastic, metal, concrete or other appropriate material suitable for the desired use and soil conditions.

Each extension 16 (FIGS. 1 and 6) is formed as an inverted channel like element with a roof like upper wall 30 (FIG. 2) thickened as at 32 and provided with spaced depending side walls 34, each having a plurality of apertures 36 formed therein. The upper wall can be reinforced when needed, this is especially necessary when used near the surface. Also, if desired, the center section as shown by dotted lines 31 in FIG. 3, can be removed to clean the extension. Legs 38 extend inwardly from each side wall 34 in a horizontal direction for a significant distance. Each leg extends for a distance that is about a substantial part of the horizontal distance of louver 43 which will be discussed subsequently. The legs 38 terminate spaced from each other to provide a bottom opening 40, and legs 39 extend outwardly for a distance. These legs prevent the extensions from sinking into the ground. If these legs were not present or did not extend a sufficient distance, the weight of the whole extension and the soil on top would cause it to sink into the ground. Prior art extensions failed to provide these legs.

A pipe 12 can be connected to the bottom of tier A so that all the liquid can be drained from the tier A. A special coupling with a spout on its bottom can be used for this purpose.

A louver 42 (FIG. 2) extends upwardly and inwardly from the lower edge 44 of each aperture 36 to terminate spaced from each other and inwardly from side walls 34; and so that their respective tips 46 are at a level higher than upper edges 48 of apertures 36. This configuration of aperture 36 and louver 42 prevents sandy, or otherwise loose soil 50, from flowing through apertures 36 into the channel 52 formed within extension 16. The fluid inside channel 52 is however, exposed to soil 50 through bottom opening 40 and through apertures 36 and the leeching action is thus not impeded.

It is noted that these apertures are rectangular to provide better leeching action. The weight of these louvers and the weight of the soil above them is supported by support 60.

If desired the tiers can be varied in size with tier C extending a greater distance from the tank than B, and tier B can extend further than tier A.

Suitable supports 60 may be formed at appropriate places in extensions 16 to strengthen the structure. These supports can be a single thick rib or two thin ribs, if desired.

A hood like structure 70 may be fitted against side walls 34 of extensions 16. Hoods 70 are open at the bottom and thus further increase the soil area which fluid spilling out of apertures 36 is exposed to. In this way the absorption is increased. This hood can have apertures in the side walls to further increase absorption, and can also be supported by ribs to increase their strength and can be designed so that they are easily slid off and removed. The hoods can be used depending on the conditions of the soil.

In FIG. 3 there is shown a septic tank 10' provided with an overflow pipe 12' through which the liquid collected in the tank 10' can flow into leeching rows A', B', and C'. A plurality of drain extensions 16' are interconnected through couplings 80 to form leeching rows A', B', and C'. The couplings are similar to the extensions and have a main support and apertures, if desired.

Couplings 80 (FIGS. 3 and 7) and extensions 16' are formed with interfitting ends in a manner similar to that for extensions 16 and their associated elements. Extensions 16' are furthermore formed like extensions 16 with apertures 36', louvers (not shown) supports (not shown), and open bottoms. If desired, couplings 80 can be eliminated and the extensions 16' connected so that they interfit directly. Also an opening 31' as shown by the dotted lines can be provided to clean the extensions. Also, tiers and/or hoods similar to those of FIG. 1 can be provided in this embodiment. These couplings 80 have the same cross section as the extensions 16' including the openings at the bottom.

As such liquid flowing through pipe 12' into leeching rows A', B' and C', moves down the channel formed through extensions 16' and therefrom through the open bottom and out apertures 16 to be absorbed by the surrounding soil. The relationship of louvers and apertures in extensions 36' is like that for extensions 16, such as to prevent inflow of the surrrounding soil while facilitating fluid absorption into the surrounding soil.

In FIG. 4 there is shown at 100 a storm drain suitably formed from concrete, metal, or the like and provided with a plurality of apertures 102. Storm drain 100 functions as a catch basin to receive rain and run-off water from storms. The water so collected must thereafter be absorbed in the surrounding soil if the drain is to continue to function.

To increase the effectiveness of drain 100, extension 160 may be connected to apertures 102 either to extend horizontally out from drain 100 or at an angle with respect thereto. Suitable couplings may be provided for the interconnection between drain 100 and extensions 160. An end cap 162 may be disposed at the extremity of extension 160 if desired.

Each extension 160 is formed from suitable material, like extensions 16, with open bottoms, (not shown), suitable supports (not shown), louvers (not shown) and apertures 166. The same leeching tiers, and/or hoods as used on the tank of FIG. 1 can be used on this storm drain also. Hoods 170 can also be placed over the apertures in the drain. These hoods have peaked top walls 172, vertical side and front walls 174 and an extending horizontal leg 176. The hoods cause better absorption into the soil.

The relationship between apertures 166 of extension 160 and the louvers disposed therewithin, like for extensions 16, cooperate to prevent inflow of soil while facilitating exposure of the liquid to soil for absorption purposes.

FIG. 5 shows an alternate form of a hood in more detail. The hood consists of two peaked interconnected sections 180 and 182, side walls 183, forward wall 184 and a continuous extending lip 186 projecting from the side and forward walls. Upwardly extending top wall 190 includes interfitting members to interlock the hood over an opening, such as openings 36 in FIG. 1.

If desired, the storm drain of FIG. 4 and the tank of FIG. 1 can be provided in sections and connected together. Dotted lines 33 show proposed division lines between the sections of the tank.

If desired, the bottom of septic tank 10 can be raised and supported on short legs or a ridge. This permits for an overflow for drainage into the soil.

A pipe 35 can be added as shown in FIG. 1 for overflow drainage. Extensions 16 and 16' and the remaining parts can be constructed of fiberglass, plastic, metal, concrete or other suitable material or combination of materials. The design of the system produces a strong, durable product, having a light weight and capable of being hand-carried. This also allows for an easy installation.

The extensions are constructed so that water may enter them, but soil cannot. This provides for use in areas where there is soil erosion.

The system of FIG. 1 is designed for installation in relatively small areas. This is ideal for buildings on small property where there is only a limited amount of space for trench-type septic systems. In these cases the depth of the trench will be determined by the size of the tank, and the width of the hole will be determined by the length of the extensions. The length of the extensions will vary when the tiers are staggered so that the various lengths may vary from 4 to 12 feet. The width may likewise vary from 2 to 3 feet. Attachment of the extension hood provides for and additional 2 feet. The above are examples and are not to be considered as limitations.

The following description will give some idea of the variety of extensions sizes available. The height of the side walls of the extensions may be determined by the width of the extension, obtaining a depth of 2½ feet, (the scale being one-third and one-half). If the width is 3 feet, the height of the side wall will be 1 foot. The maximum width for this scale may be 3 feet, and the minimum length will be 4 feet. If the width is 3 feet, the side wall will be 1½ feet. The maximum width for this scale is 5 feet, and the minimum length is also 5 feet. It is noted that the reason for the change in scales is that the one-half scale provides more support for the wider extensions, whereas the one-third scale provides the best advantage up to the maximum width of 3 feet.

Simply by extending the side and main supports downward, thereby changing their angle, the height of the side walls can be made larger. The depth may be extended to 4 feet and the extension made wider if desired. The width may be 12 feet when using the one-half scale. The size of the apertures on the side walls is determined by the depth of the side walls, the length of the extension, and the spacing of the main supports. The main supports should not be spaced more than 3 feet apart.

The depth of the aperture is approximately one-half the depth of the side walls, as illustrated by the following example. If the depth of the extension is 4 feet, the depth of the aperture will be 2 feet, and if the extension is 10 feet long, the aperture will have a length of 2½ feet (taking into account the thickness of the three main supports which are approximately 4½ inches, and allowing 8 inches on each end for coupling). The thickness of the side wall may be one-fourth – one-half inch for the smaller sizes, and between 1 and 2 inches for the larger sizes. The louver is approximately the same thickness as the side wall for the smaller sizes, and should not have to be more than 1 inch for the larger sizes. The thickness of the main support may be 2 and 3 inches, and should not have to exceed 6 inches. The roof thickness is determined by the width, and if the width is 4 feet, the thickness is 8 inches.

From the above description it will thus be seen that a novel and improved drain extension has been provided; which extension is formed in a simple and inexpensive manner with louvered apertures formed so as to prevent inflow of adjacent soil while permitting exposure of liquid to the soil for absorption purposes; and which extensions are adapted to interconnection to each other and through associated elements to form drainage arrangements for storm drains, seeping wells, and septic tanks.

While specific embodiments of the invention have been described, it will be appreciated that many modifications thereof may be made by one skilled in the art which falls within the true spirit and scope of the invention.

I claim:
1. A drainage arrangement including drain means, said drain means comprising:
   a first side wall of predetermined height and length;
   a second side wall of predetermined height and length disposed opposed to and spaced from said first side wall;
   said side walls having upper, lower and edge extremeties;
   surface means interconnecting said first side wall and said second side wall proximate said upper extremeties thereof so as to form therewith a substantially U-shaped channel like member;
   at least one aperture extending through at least one of said side walls; and
   louver like means extending inwardly and upwardly from the lower edge of said aperture, into said channel like member, and terminating spaced from said side wall at a level above the level of the upper edge of said aperture.
2. The drain means of claim 1 wherein support means are disposed within said channel like member to strengthen same and said louver like means.
3. The drain means of claim 1 wherein said channel like member is open at its ends.
4. The drain means of claim 1 wherein open bottomed hood means are disposed proximate the outer surface of said aperture.
5. The drainage arrangement of claim 1 wherein there are a plurality of drain means constructed to be interconnected in a predetermined configuration.
6. The drainage arrangement of claim 5 wherein said predetermined configuration forms a closed loop which is to be disposed around a septic tank or the like.
7. The drain means of claim 1 wherein leg members extend outwardly and inwardly from each side member, with inwardly extending portions of said leg members terminating spaced from each other.
8. The drainage arrangement of claim 1 wherein a plurality of drain means extend at a predetermined angle with respect to the vertical from a substantially circular storm type drain device and wherein said predetermined angle may be 90° for at least some of said drain means.
9. A drainage arrangement including drain means, said drain means comprising:
   a first side wall of predetermined height and length;
   a second side wall of predetermined height and length disposed opposed to and spaced from said first side wall;
   said side walls having upper, lower and edge extremeties;
   surface means interconnecting said first side wall and said second side wall proximate said upper extremeties thereof so as to form therewith a substantially U-shaped channel like member;
   at least one aperture extending through at least one of said side walls; and
   louver like means extending inwardly and upwardly from the lower edge of said aperture, into said channel like member, and terminating spaced from said side wall at a level above the level of the upper edge of said aperture,
   a plurality of said U-shaped channel like members being interconnected into a plurality of closed loops disposed in spaced relationship one over the other around a septic tank or the like;
   fluid conduit means connecting said plurality of closed loops together so that fluid, when disposed therewithin, can flow from a lower loop into the next upper loop;
   fluid entering means for the lowermost of said loops; and
   fluid exiting means provided from the uppermost of said loops.

* * * * *